US012522136B1

(12) United States Patent
Weston et al.

(10) Patent No.: US 12,522,136 B1
(45) Date of Patent: Jan. 13, 2026

(54) CONVERTIBLE VEHICLE LIGHTING ASSEMBLY HAVING PRINTED ELECTRONICS APPLIED TO TOP OF VEHICLE

(71) Applicant: Ford Global Technologies, LLC, Dearborn, MI (US)

(72) Inventors: Keith Weston, Canton, MI (US); David D. Friske, Wolverine Lake, MI (US); Michael Joseph Niksa, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/928,975

(22) Filed: Oct. 28, 2024

(51) Int. Cl.
*B60Q 3/49* (2017.01)
*B60Q 3/20* (2017.01)
*H02J 50/10* (2016.01)

(52) U.S. Cl.
CPC .............. *B60Q 3/49* (2017.02); *B60Q 3/20* (2017.02); *H02J 50/10* (2016.02)

(58) Field of Classification Search
CPC .................................. B60Q 3/49; H02J 50/10
See application file for complete search history.

(56) References Cited

U.S. PATENT DOCUMENTS

| 4,864,473 | A | 9/1989 | Tokarz et al. |
|---|---|---|---|
| 5,429,409 | A | 7/1995 | Corder et al. |
| 5,845,987 | A | 12/1998 | Painter |
| 10,967,786 | B1 | 4/2021 | Richardson et al. |
| 11,225,191 | B2 * | 1/2022 | Ali ........................ B60R 16/023 |
| 2009/0040588 | A1 | 2/2009 | Tonar et al. |
| 2017/0334342 | A1 | 11/2017 | Dellock et al. |
| 2017/0341571 | A1 | 11/2017 | Salter et al. |
| 2018/0010769 | A1 | 1/2018 | Salter et al. |
| 2020/0396808 | A1 | 12/2020 | Langhorst et al. |
| 2023/0278498 | A1 | 9/2023 | Foote et al. |

FOREIGN PATENT DOCUMENTS

| DE | 102017128896 A | 6/2019 |
|---|---|---|
| EP | 3110655 B1 | 9/2020 |
| WO | 2011143471 A1 | 11/2011 |

OTHER PUBLICATIONS

Zhang, Yuezhou, Flexible Electronic Packaging and Encapsulation Technology: Application of Flexible Electronics Packaging, pp. 195-237, Wiley Semiconductors, DOI: 10.1002/9783527845729.ch?. (Abstract Only).

(Continued)

*Primary Examiner* — Robert J May
(74) *Attorney, Agent, or Firm* — Vichit Chea; Carlson, Gaskey & Olds, P.C.

(57) ABSTRACT

A convertible vehicle lighting assembly includes a top of a convertible vehicle. The top is configured to be transitioned between a closed position and an open position relative to a body of the convertible vehicle. Printed electronics are applied to the top. A lighting device is mounted to the top. The lighting device is powered by electrical energy that is transferred to the lighting device through the printed electronics.

18 Claims, 3 Drawing Sheets

(56) References Cited

OTHER PUBLICATIONS

Wei, Zhenrong, Flexible Electronic Packaging and Encapsulation Technology: Analysis of Flexible Electronic Packaging Enterprise, pp. 271-336, Wiley Semiconductors, DOI: 10.1002/9783527845729.ch9. (Abstract Only).

Mishra, Umakant, Inventions on Keyboard Illumination—A Triz Based Analysis, https://doi.org/10.48550/arXiv.1307.6378, (Abstract Only).

Wolfframm, Bodo M., IEEE Transactions on Industry Applications, vol. IA-20, Issue: 4, pp. 1079-1085, Jul. 1984, History of the Production and Application of Light Committee, DOI: 10.1109/TIA.1984.4504549. (Abstract Only).

Fleming, Bill, Advances in Automotive Electronics, IEEE Vehicular Technology Magazine, vol. 10, Issue: 3, pp. 4-11, Sep. 2015, DOI: 10.1109/MVT.2015.2446446. (Abstract Only).

Richardson, Martin J. et al., The Hologram: Principles and Techniques, 2018. (Abstract Only).

Fies, John, Electrical Features of the Texas Centennial Central Exposition, Electrical Engineering, vol. 55, Issue: 10, pp. 1060-1074, Oct. 1936, DOI: 10.1109/EE.1936.6539186. (Abstract Only).

Forester, John, Effective Cycling; Riding at Night, pp. 453-476, 2012, MIT Press. (Abstract Only).

\* cited by examiner

CONVERTIBLE VEHICLE LIGHTING ASSEMBLY HAVING PRINTED ELECTRONICS APPLIED TO TOP OF VEHICLE

TECHNICAL FIELD

This disclosure details exemplary lighting assemblies and lighting methods utilized in connection with a top of a convertible vehicle.

BACKGROUND

Some vehicles are convertible vehicles, which have a top that can be removed or retracted to provide vehicle occupants with an open-air driving experience. Some such tops are hard tops. Other such tops are soft-tops, which can include a flexible material such as fabric or vinyl.

SUMMARY

In some aspects, the techniques described herein relate to a convertible vehicle lighting assembly, including: a top of a convertible vehicle, the top configured to be transitioned between a closed position and an open position relative to a body of the convertible vehicle; printed electronics that are applied to the top; and a lighting device mounted to the top, the lighting device powered by electrical energy that is transferred to the lighting device through the printed electronics.

In some aspects, the techniques described herein relate to a convertible vehicle lighting assembly, wherein electrical energy is transferred to the printed electronics through a wireless interface between the top and the body.

In some aspects, the techniques described herein relate to a convertible vehicle lighting assembly, wherein the wireless interface includes an inductive pad mounted to the top, the electrical energy transferred to the top through the inductive pad.

In some aspects, the techniques described herein relate to a convertible vehicle lighting assembly, wherein the top is inductively coupled to the body when the top is in a closed position relative to the body of the convertible vehicle.

In some aspects, the techniques described herein relate to a convertible vehicle lighting assembly, wherein the top is a soft top.

In some aspects, the techniques described herein relate to a convertible vehicle lighting assembly, wherein the top is removed from the body of the convertible vehicle when the top is in the open position.

In some aspects, the techniques described herein relate to a convertible vehicle lighting assembly, wherein the lighting device is a dome light.

In some aspects, the techniques described herein relate to a convertible vehicle lighting assembly, wherein the lighting device includes an electroluminescent coating on an underside of the top.

In some aspects, the techniques described herein relate to a convertible vehicle lighting assembly, wherein the lighting device includes an electroluminescent paint on an underside of the top.

In some aspects, the techniques described herein relate to a convertible vehicle lighting assembly, wherein the printed electronics are a conductive ink.

In some aspects, the techniques described herein relate to a convertible vehicle lighting assembly, wherein the conductive ink is printed on the top.

In some aspects, the techniques described herein relate to a convertible vehicle lighting assembly, wherein the lighting device is an emblem.

In some aspects, the techniques described herein relate to a convertible vehicle lighting method, including: printing electronics on a piece of material, the electronics configured to transfer electrical energy to a lighting device; and using the piece of material as at least a portion of a top of a convertible vehicle.

In some aspects, the techniques described herein relate to a convertible vehicle lighting method, wherein printing the electronics includes printing a conductive ink on the piece of material.

In some aspects, the techniques described herein relate to a convertible vehicle lighting method, wherein the electronics are configured to receive electrical energy from a body of a vehicle.

In some aspects, the techniques described herein relate to a convertible vehicle lighting method, wherein the electrical energy is received by the electronics through a wireless interface configured to transfer electrical energy when the top is in a closed position relative to a body of the vehicle.

In some aspects, the techniques described herein relate to a convertible vehicle lighting method, wherein the wireless interface is an inductive interface.

In some aspects, the techniques described herein relate to a convertible vehicle lighting method, wherein the lighting device is a dome light.

In some aspects, the techniques described herein relate to a convertible vehicle lighting method, wherein the lighting device includes an electroluminescent coating on an underside of the top.

In some aspects, the techniques described herein relate to a convertible vehicle lighting method, wherein the top is a removable top.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a lighting assembly and a lighting method utilized in connection with a top of a convertible vehicle. The top can be a soft top. Printed electronics on the top can be used to transfer electrical energy to a lighting device secured to the top. The lighting device can be used as a dome light.

Figure 1:
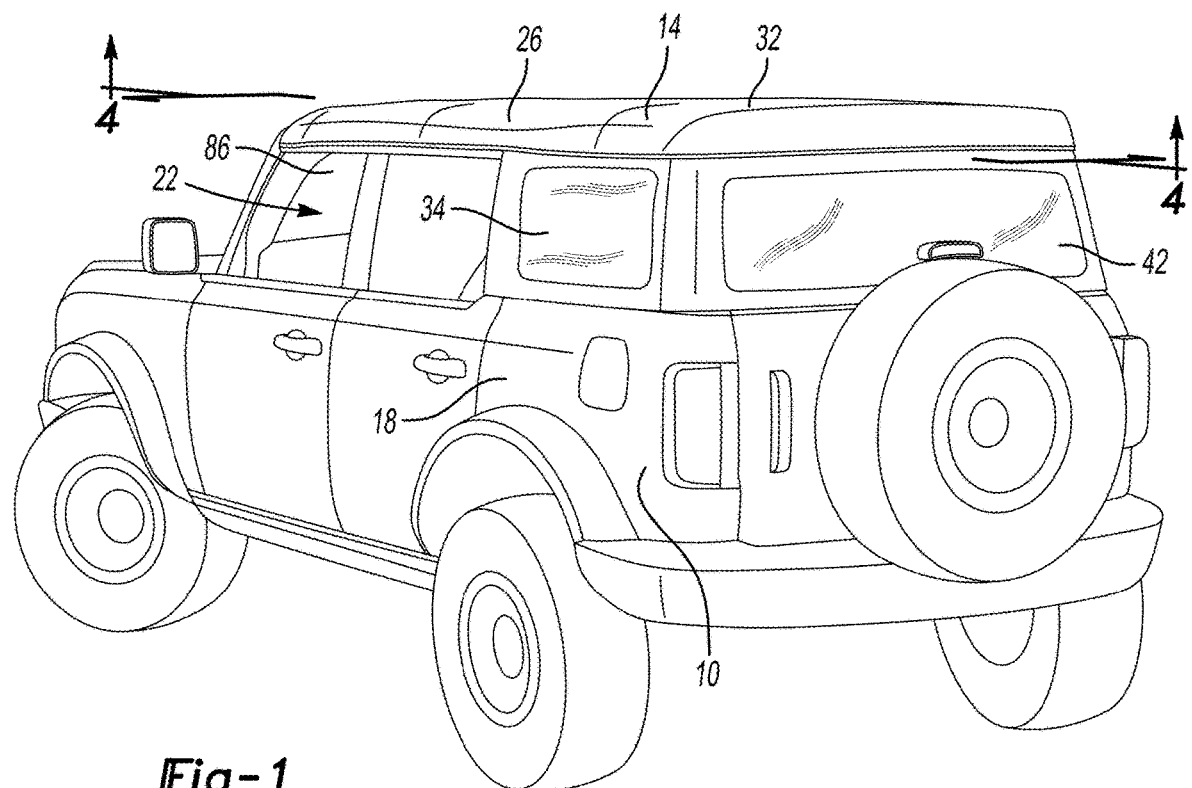
FIG. 1 illustrates a perspective view of a convertible vehicle having a top in a closed position according to an exemplary embodiment of the present disclosure.
Figure 2:
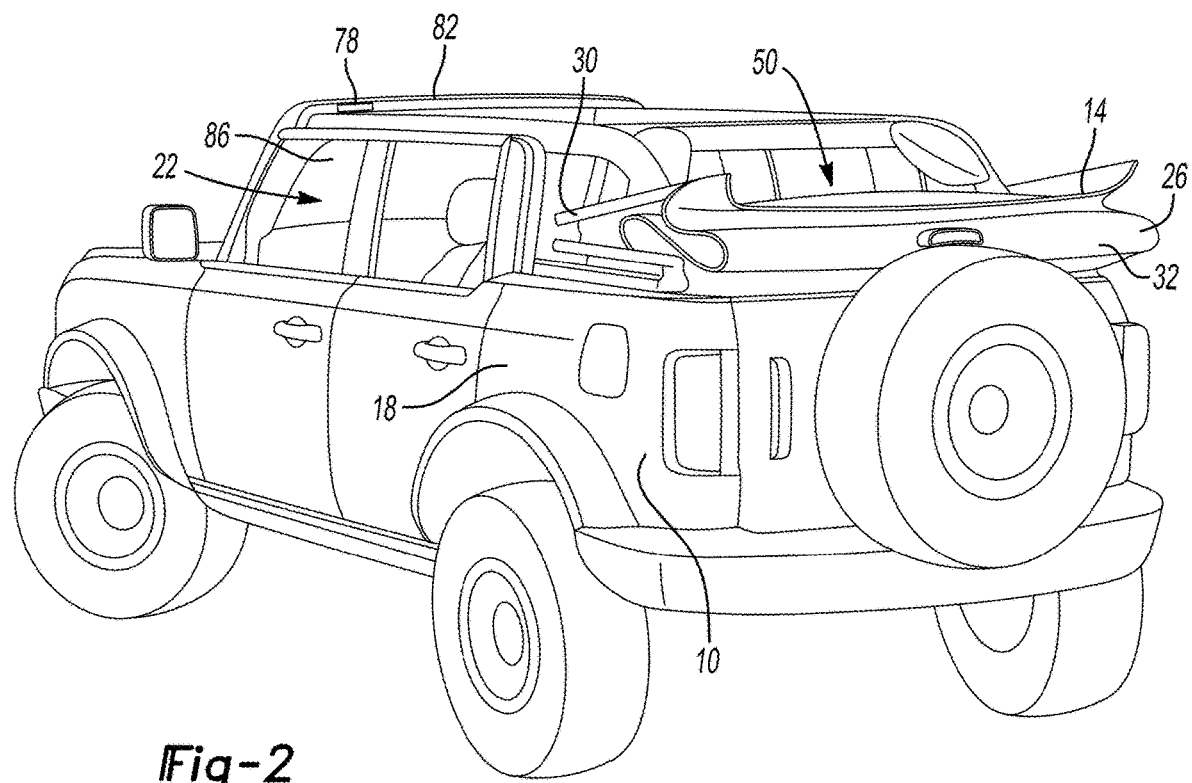
FIG. 2 illustrates the convertible vehicle of FIG. 1 with the top in an open position.
Figure 3:
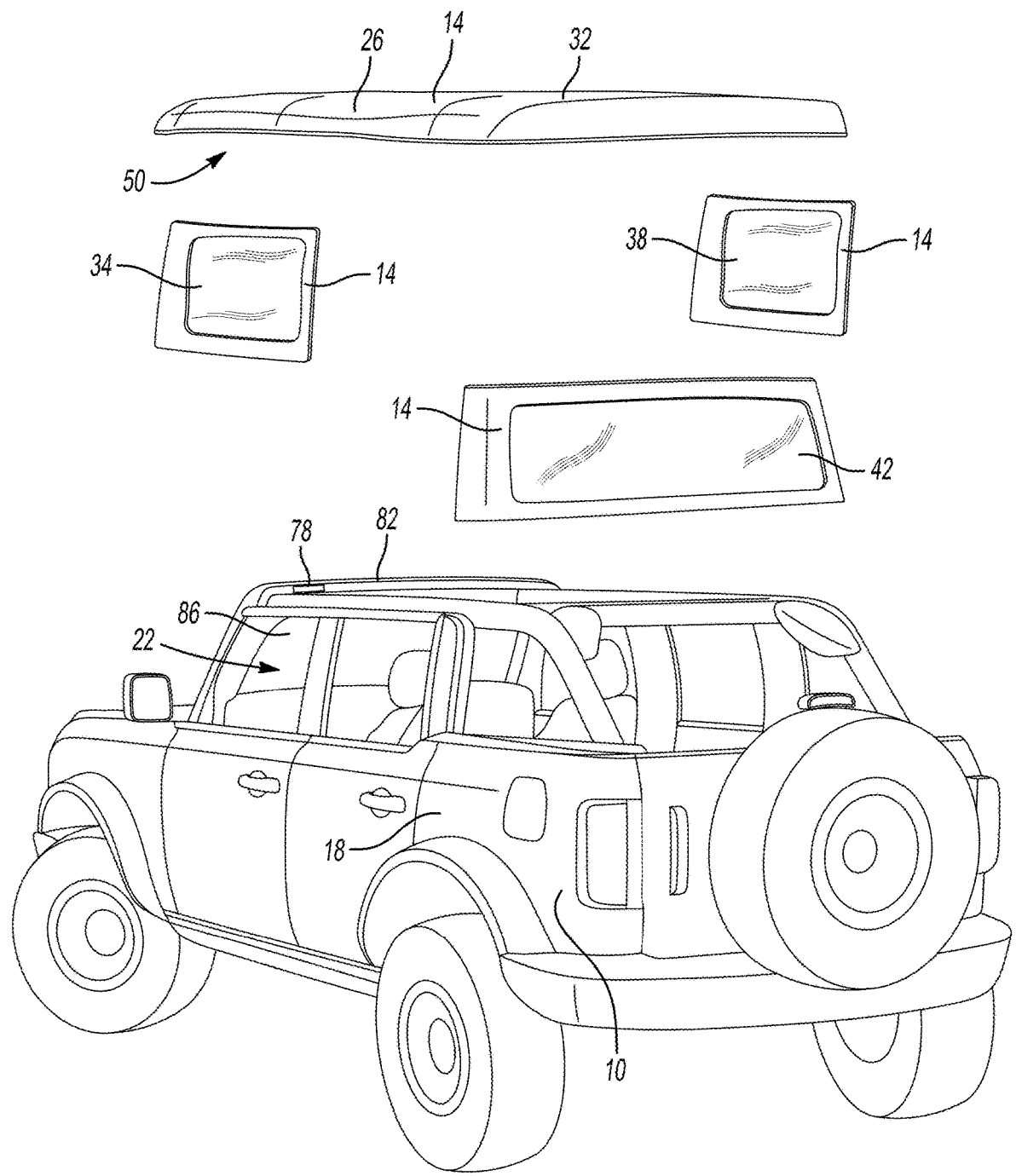
FIG. 3 illustrates the convertible vehicle of FIG. 1 with the top in another open position.

With reference to FIGS. 1-3, an example vehicle 10 is a convertible vehicle. The example vehicle 10 has a top 14 that can be transitioned back and forth between a closed position relative to a vehicle body 18 as shown in FIG. 1, and an open position relative to the vehicle body 18 as shown in FIGS. 2 and 3. The top 14 in the open position can provide one or more occupants of the vehicle 10 with an open-air driving experience. When the top 14 is in the closed position, the top 14 can cover a passenger compartment 22 of the vehicle 10.

The example top 14 in the open position can remain secured to the vehicle body 18 but retracted as shown in FIG. 2. The top 14 in the open position can be removed from the vehicle body 18 when the top 14 is in the open position as shown in FIG. 3. After removing the top 14 from the vehicle body 18, the top 14 can then be stored while the vehicle 10 is driven. In other exemplary vehicles that are convertible vehicles, the top could be retracted within the vehicle body when the top is in the open position. The vehicle then driven with the top retracted within the vehicle body.

The example top 14 is a soft-top comprised of a plurality of pieces of material 26 that are joined together and supported on support structures 30. In this example, the pieces providing the top include a roof portion 32, a driver side window portion 34, a passenger side window portion 38, and a rear window portion 42. The material 26 can include a fabric material, a polymer based material such as vinyl, some other material, or a combination of materials. The material 26 can be fastened together using mechanical fasteners, hook-and-loop fasteners, stitches, another type of fastener, or some combination of fasteners. The top 14 can include support structures 30 that hold and support the plurality of pieces of material 26. The support structures 30 can be metal or metal alloy bars.

Figure 4:
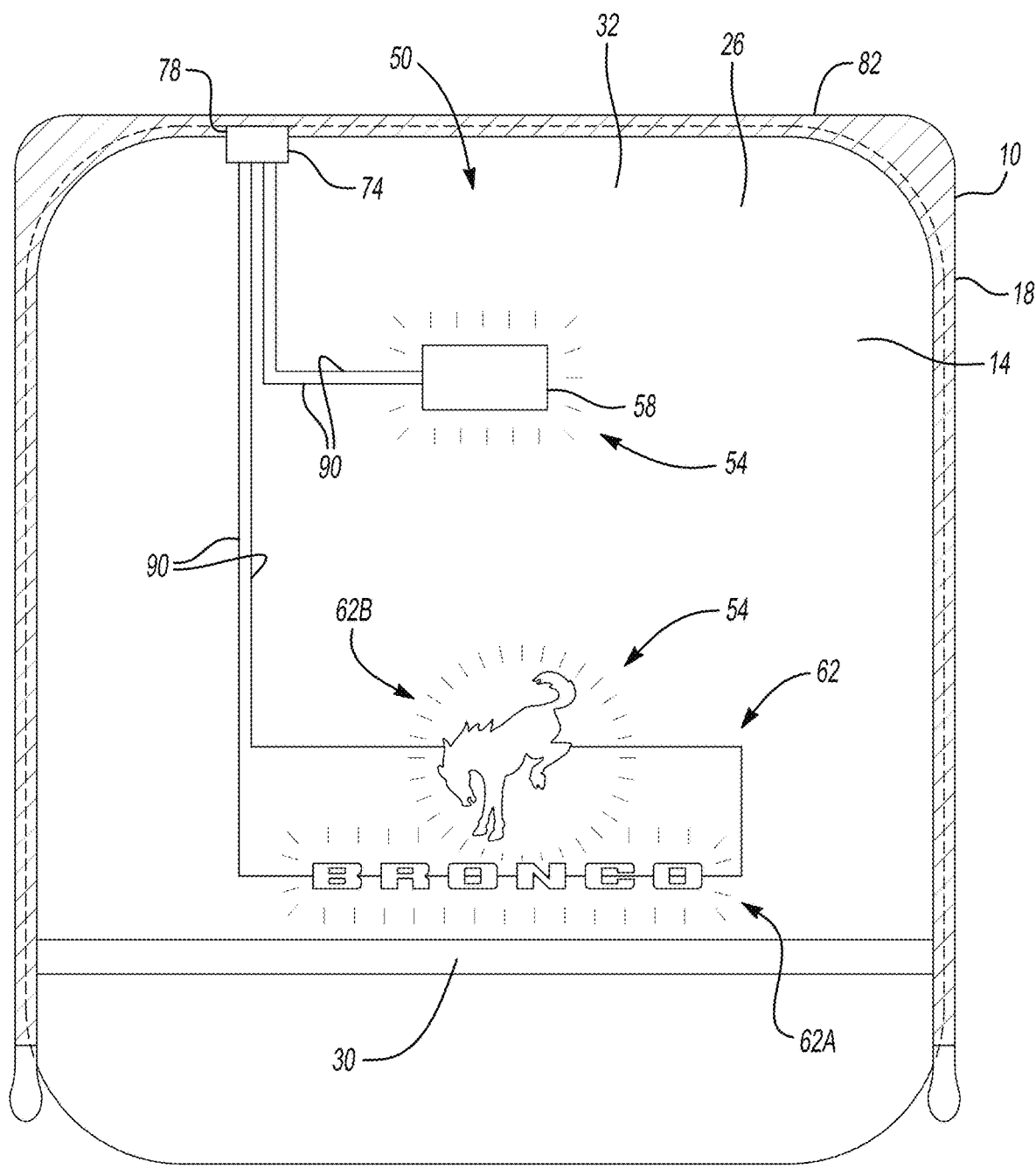
FIG. 4 illustrates section view taken at line 4-4 in FIG. 1 and showing an underside view of a roof portion of the top of FIG. 1 according to the exemplary embodiment.

With reference now to FIG. 4 and continuing reference to FIGS. 1-3, when the top 14 is in the closed position, an underside 50 of the roof portion 32 faces the passenger compartment 22. The example top 14 includes at least one lighting device 54 on the underside 50 of the roof portion 32. The at least one lighting device 54 can be a dome light 58 for the passenger compartment 22 of the vehicle 10. The dome light 58 can be powered to illuminate the passenger compartment 22 when the top 14 is in the closed position. The at least one lighting device 54 can be a logo 62 that can partially or fully light up to illuminate the passenger compartment when the top is in the closed position. The logo 62 can include a text portion 62A and an emblem portion 62B. In other examples, the at least one lighting device 54 could instead or additionally be positioned on the driver side window portion 34, the passenger side window portion 38, or the rear window portion 42.

When the top 14 is in the closed position, the top 14 can receive electrical energy from the vehicle body 18 of the vehicle 10 through a wireless interface. The example wireless interface comprises an roof inductive pad 74 and a body inductive pad 78. The roof inductive pad 74 is mounted to the roof portion 32 of the top 14. The body inductive pad 78 is mounted on a header 82 of the vehicle body 18 at a position above a front windshield 86 of the vehicle 10.

The roof inductive pad 74 interfaces directly with the body inductive pad 78 when the top 14 is in the closed position. When the top 14 is in the closed position, the roof inductive pad 74 is aligned with the body inductive pad 78. When the roof inductive pad 74 interfaces directly with the body inductive pad 78, electrical energy can pass from the body inductive pad 78 to the roof inductive pad 74—the top 14 is thus inductively coupled to the vehicle body 18 when the top 14 is in a closed position relative to the vehicle body 18.

The electrical energy can be provided to the body inductive pad 78 from a power supply within the vehicle body 18 of the vehicle 10. The power supply can be an accessory battery, for example. In some examples, piezo-power from movement of, for example, mud flaps or wheel house liners, could provide some or all of the electrical energy to the body inductive pad 78.

In this example, printed electronics 90 are applied to the underside 50 of the roof portion 32. The printed electronics 90 can be a printed ink. In an example, the ink can be a silver conductive ink applied by a sprayer to an area of the underside 50. The printed electronics 90 can flex with the top 14 as the top 14 is transferred back-and-forth between the closed position and the open position. In other examples, wires could be used instead of, or in addition to, the printed electronics 90.

Electrical energy transferred by the body inductive pad 78 to the roof inductive pad 74 is transferred to the at least one lighting device 54 through the printed electronics 90. The electrical energy transferred to the at least one lighting device 54 can power the at least one lighting device 54 and illuminate the passenger compartment 22 of the vehicle 10.

In this example, the at least one lighting device 54 is an electroluminescent coating applied to the underside 50 of the top 14. In some examples, the at least one lighting device 54 can be an electroluminescent paint applied to the underside 50 of the top. The electroluminescent coating, electroluminescent paint, or both, can be integrated into the material forming the top 14 in some examples. The electroluminescent coating, electroluminescent paint, or both can be adhesively secured to the top 14 in some examples. The at least one lighting device 54 can be molded into the top 14.

Although shown in the underside 50, the at least one lighting device 54 could be on an exterior side of the top 14. Such the at least one lighting device 54 could provide a Center High Mount Stop Lamp or a clearance light, for example.

The electroluminescent coating can form all of the logo 62, just the text portion 62A, or just the emblem portion 62B. Electrical energy can be routed to particular areas of the at least one lighting device 54 to selectively light up areas of the at least one lighting device 54. For example, the text portion 62A can be selectively illuminated separately from the emblem portion 62B. In some examples, the electrical energy can be transferred to the at least one lighting device 54 to gradually light up the at least one lighting device 54, or to provide a gradient effect for the dome light 58, the text portion 62A, the emblem portion 62B, or some combination of these.

In some examples, providing the top 14 for the vehicle 10 can include printing electronics on one or more pieces of material, such as a vinyl or fabric material. An electroluminescent coating can also be applied to one or more of the pieces of material. After the printing, the piece of material can be combined with one or more other pieces of material to form the top 14. Combining the pieces of material can include securing the pieces together by, for example, sewing together the pieces of material. These pieces of material can then be supported on the support structures 30 to provide the top 14.

Features of the disclosed examples include incorporating printed electronics into a top of a convertible vehicle. The top can be a soft-top. Utilizing printed electronics can facilitate providing the ability to transfer power to a lighting assembly without wires or other rigid structures utilized to transfer electrical energy. The printed electronics can flex as the top is transitioned back-and-forth between the closed position and the open position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A convertible vehicle lighting assembly, comprising:
    a top of a convertible vehicle, the top configured to be transitioned between a closed position and an open position relative to a body of the convertible vehicle;
    printed electronics that are applied to the top; and
    a lighting device mounted to the top, the lighting device powered by electrical energy that is transferred to the lighting device through the printed electronics, wherein electrical energy is transferred to the printed electronics through a wireless interface between the top and the body, wherein the top is inductively coupled to the body when the top is in a closed position relative to the body of the convertible vehicle.

2. The convertible vehicle lighting assembly of claim 1, wherein the wireless interface comprises an inductive pad mounted to the top, the electrical energy transferred to the top through the inductive pad.

3. The convertible vehicle lighting assembly of claim 1, wherein the top is a soft top.

4. The convertible vehicle lighting assembly of claim 1, wherein the top is removed from the body of the convertible vehicle when the top is in the open position.

5. The convertible vehicle lighting assembly of claim 1, wherein the lighting device is a dome light.

6. The convertible vehicle lighting assembly of claim 1, wherein the lighting device comprises an electroluminescent coating on an underside of the top.

7. The convertible vehicle lighting assembly of claim 1, wherein the lighting device comprises an electroluminescent paint on an underside of the top.

8. The convertible vehicle lighting assembly of claim 1, wherein the printed electronics are a conductive ink.

9. The convertible vehicle lighting assembly of claim 8, wherein the conductive ink is printed on the top.

10. The convertible vehicle lighting assembly of claim 1, wherein the lighting device is an emblem.

11. The convertible vehicle lighting assembly of claim 1, wherein the wireless interface is wherein the top is inductively coupled to the body.

12. A convertible vehicle lighting method, comprising:
    printing electronics on a piece of material, the electronics configured to transfer electrical energy to a lighting device; and
    using the piece of material as at least a portion of a top of a convertible vehicle, wherein the electrical energy is received by the electronics through a wireless interface, the top configured to be inductively coupled to a body of the convertible vehicle when the top is in a closed position relative to the body of the convertible vehicle.

13. The convertible vehicle lighting method of claim 12, wherein printing the electronics comprises printing a conductive ink on the piece of material.

14. The convertible vehicle lighting method of claim 12, wherein the electronics are configured to receive electrical energy from a body of a vehicle.

15. The convertible vehicle lighting method of claim 12, wherein the lighting device is a dome light.

16. The convertible vehicle lighting method of claim 12, wherein the lighting device comprises an electroluminescent coating on an underside of the top.

17. The convertible vehicle lighting method of claim 12, wherein the top is a removable top.

18. The convertible vehicle lighting method of claim 12, wherein the wireless interface is wherein the top is inductively coupled to the body.

* * * * *